United States Patent [19]

Korytko

[11] 4,086,832
[45] May 2, 1978

[54] APPARATUS FOR SHEARING A WORKPIECE SUCH AS A METAL BAR OR THE LIKE

[75] Inventor: Myron I. Korytko, Erie, Pa.

[73] Assignee: Efco, Inc., Erie, Pa.

[21] Appl. No.: 662,267

[22] Filed: Feb. 27, 1976

[51] Int. Cl.² .................. B26D 1/06; B23D 15/04
[52] U.S. Cl. ............................... 83/198; 83/17; 72/338; 83/580; 83/694
[58] Field of Search ............... 83/14, 42, 198, 580, 83/17, 694; 72/338

[56] References Cited

U.S. PATENT DOCUMENTS

| | | | |
|---|---|---|---|
| 1,901,067 | 3/1933 | Vickers | 83/198 |
| 2,039,840 | 5/1936 | Howland-Shearman | 83/14 |
| 3,252,364 | 5/1966 | Veres et al. | 83/14 |
| 3,552,253 | 1/1971 | MacDonald | 83/198 X |
| 3,590,674 | 7/1971 | Maeda | 83/14 |
| 3,824,885 | 7/1974 | Marshall et al. | 83/176 X |

FOREIGN PATENT DOCUMENTS 1,040,804  9/1966  United Kingdom ............... 83/198

*Primary Examiner*—Willie G. Abercrombie
*Attorney, Agent, or Firm*—Baldwin, Egan, Walling & Fetzer

[57] ABSTRACT

An apparatus for shearing an elongated metal workpiece by applying a generally radial compressive load to the workpiece generally circumferentially thereof, and shearing the workpiece adjacent the compressive load applying means along a plane generally perpendicular to the lengthwise axis of the workpiece.

4 Claims, 4 Drawing Figures

APPARATUS FOR SHEARING A WORKPIECE SUCH AS A METAL BAR OR THE LIKE

This invention relates in general to the shearing of metal workpieces such as steel bars and the like, and more particularly relates to a apparatus for shearing an extruded workpiece so that the shearing operation results in a sheared end face that is smooth with no fracturing or cracking therein.

BACKGROUND OF THE INVENTION

Sawing is a conventionally used process for the cutting up of elongated metal workpieces, such as metal bars and metal wires. Moreover, milling operations are commonly used for cutting off extruded workpieces of uniform cross section, in order to assure the proper length, and with ends thereon perpendicular to the lengthwise axis of the workpiece. Various methods of shearing have been attempted for accomplishing a shearing operation on a metal bar workpiece. U.S. Pat. No. 3,252,364 dated May 24, 1966, and issued to Ferenc Veres, et al discloses a method and apparatus for cutting up a metal bar by shearing and wherein the latter is subjected to a compressive force applied to the bar in a direction parallel to the longitudinal axis of the bar, to facilitate the shearing operation. Also in U.S. Pat. No. 3,590,674 issued July 6, 1971, to Teizo Maeda, there is disclosed a method of shearing bar material by holding the bar workpiece in position adjacent the point of the shearing so as to restrain axial movement while pressure shearing by vertical movement against the axis of the workpiece. U.S. Pat. No. 3,651,683 dated Mar. 28, 1972, discloses a cold molding press having means for shearing off an unwanted overlength portion of a workpiece.

SUMMARY OF THE INVENTION

The present invention provides an apparatus for shearing a workpiece, such as an extruded metal bar or the like, in a manner resulting in a smooth cut surface and one without any fracturing of the extruded workpiece at the cut surface, and more particularly relates to an apparatus wherein a generally radially directed compressive load, which is at least equal to the force necessary to cause plastic flow in the material of the workpiece, is applied to the workpiece generally circumferentially thereof, and then the shearing is accomplished, adjacent the application of the compressive load and in a plane generally perpendicular to the lengthwise axis of the workpiece.

Accordingly, an object of the invention is to provide a novel apparatus which results in non-deformation of the cut or sheared surface of the workpiece, and without occurrence of fracturing in the workpiece.

A still further object of the invention is to provide an apparatus for shearing an extruded bar-like metal workpiece which includes applying a generally radial compressive load to the workpiece in an amount at least equal to the force necessary to cause plastic flow of the material of the workpiece and generally circumferentially thereof, and then shearing the bar adjacent the application of compressive load to the workpiece in a plane generally perpendicular to the lengthwise axis of the workpiece, resulting in a workpiece which will have a smooth cut end surface and no fracturing thereof, and one wherein the workpiece will retain its cross section without any substantial deformation.

A still further object of the invention is to provide a novel mechanism for accomplishing expeditious shearing of metal bar-like extruded workpieces, and in a manner wherein the cut surface or cut end face of the workpiece is maintained generally smooth without embodying fracturing thereof due to the shearing operation, and wherein a selected length of the bar can be sheared therefrom.

Other objects and advantages of the invention will be apparent from the following description taken in conjunction with the accompanying drawings wherein:

DESCRIPTION OF PREFERRED EMBODIMENTS

Figure 2:
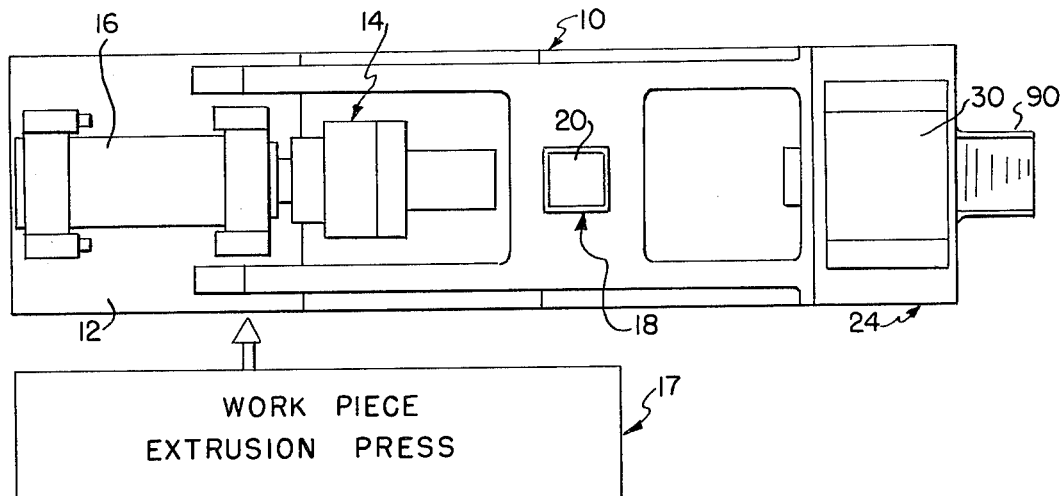
FIG. 2 is a top plan view of the apparatus of FIG. 1; an associated extrusion press is illustrated diagrammatically.
Figure 1:
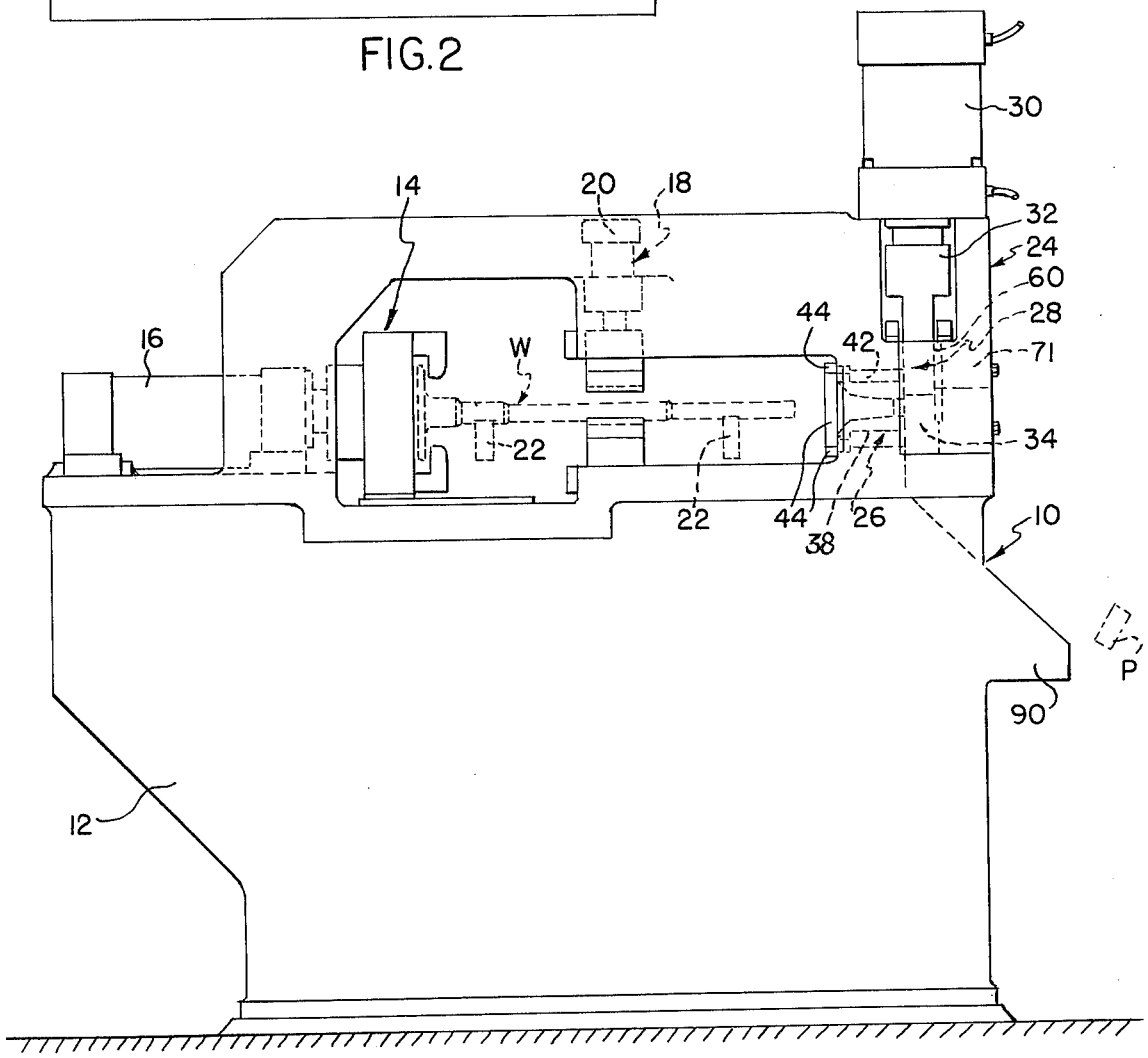
FIG. 1 is a side elevational, generally diagrammatic illustration of an apparatus embodying the invention.

Referring now to FIGS. 1 and 2, there is illustrated an apparatus or mechanism 10 comprising a base 12 on which is mounted a movable holder 14, adapted for actuation by a fluid powered push-pull cylinder 16 of suitable and conventional type, adapted to axially move an elongated metal bar or other workpiece W formed, in the embodiment illustrated, by cold extruding a stock bar through a die orifice of an extrusion die of an associated extrusion unit 17. A clamping mechanism 18 may be provided on mechanism 10 for clamping the workpiece W during the hereafter described shearing operation, with such clamping mechanism 18 being adapted to be actuated and deactuated by means of a conventional fluid powered ram motor unit 20. Various transfer arm supports 22 may be provided on the mechanism 10 for supporting the lengthwise extent of the metal workpiece W during the shearing thereof.

A shearing apparatus 24 is provided on the mechanism 10, adapted for shearing the workpiece W in a manner to provide a smooth cut end surface generally without deformation of the cross sectional area of the workpiece, and generally without any fracturing occurring at the cut surface of the workpiece because of the shearing operation. The shearing apparatus 24 may be integrally formed with the remainder of apparatus 10, or may be arranged for ready detachable mounting thereon.

Apparatus 24 comprises a compressive force applying means 26, adapted for applying a generally radial compressive force to the workpiece adjacent the area to be severed, which force is at least equal to the force necessary to cause cold plastic flow of the material of the workpiece bar, together with a shearing means 28 which is adapted to shear the metal workpiece in a direction generally perpendicular to the lengthwise axis thereof, and adjacent the location of the afore-mentioned radial compressive force being applied to the workpiece.

Shearing means 28 in the embodiment illustrated includes a reciprocal preferably fluid actuated power unit or ram motor 30, coupled to a shearing blade or cutter 32, which is adapted in the embodiment illustrated, to move vertically along a path 34 provided in the shearing mechanism 24. The force applying means 26 in the embodiment illustrated, comprises a holding die 38 formed of for instance hardened, heat treated metal or of carbide material, and which includes an inwardly tapered passageway 40 therethrough, adapted for receiving the bar workpiece and to progressively cold work it as the bar is moved axially through the holding die by the push cylinder 16. The die 38 is disposed in a receptacle or holder block 42 which aligns the die with the axis of the incoming bar workpiece W, and which is removably held in position by means of locking strips 44 adjacent the passageway 40 through die 38. Strips 44 may be secured as by threaded fasteners 46. Die member 38 may be provided with a shouldered section 48 for facilitating positioning of the die in the holder block 42. The rearward end of the passageway 40 through the die preferably comprises a generally linearly extending zone or section 50 so that the compressive force or load applied by the holding die to the extruded bar stock as it is forced through the die, is applied over predetermined zone 50 in a direction lengthwise of the bar stock, and which is applied generally circumferentially of the bar stock. The size of the passageway 40 through holding die 38 is such that the compressive force or load applied by the die 38 to the bar is at least equal to the force necessary to cause cold plastic flow in the material of the bar. For instance in a bar composed of SAE 1045 steel, such compressive force will be in the order of at least approximately 60,000 p.s.i., which is generally equal to the yield strength in compression of the steel material. The steel of workpiece W was previously cold worked, of course, in the first mentioned extrusion die in unit 17, and as for example was extruded through the extrusion die at for instance 240,000 p.s.i. which is approximately four times the yield strength of the material. This insures flow of the material without defects therein.

Figure 3:
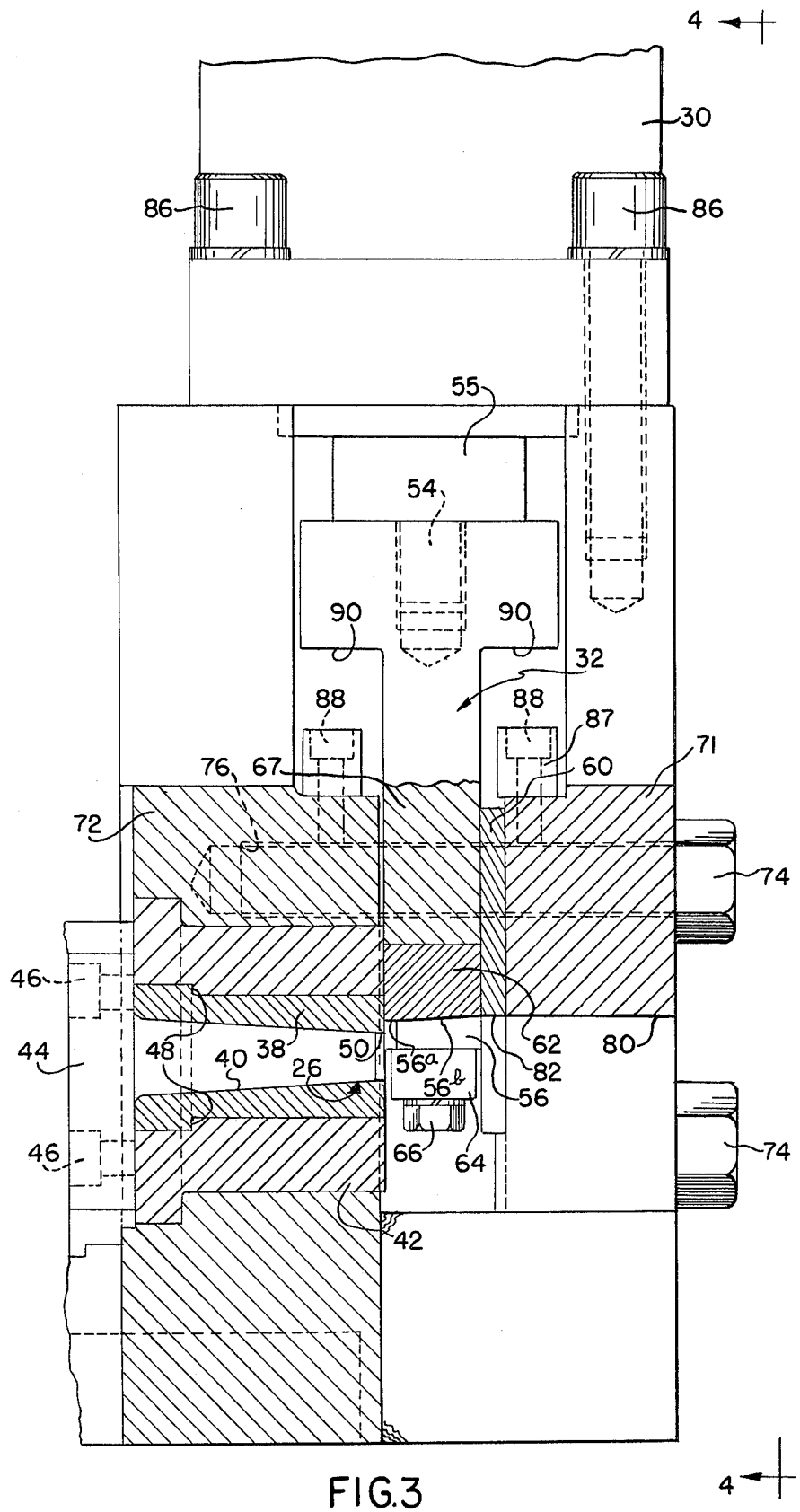
FIG. 3 is an enlarged, partially broken sectional view taken generally along the plane of line 3—3 of FIG. 4 looking in the direction of the arrows, and illustrating the shearing mechanism of the invention.
Figure 4:
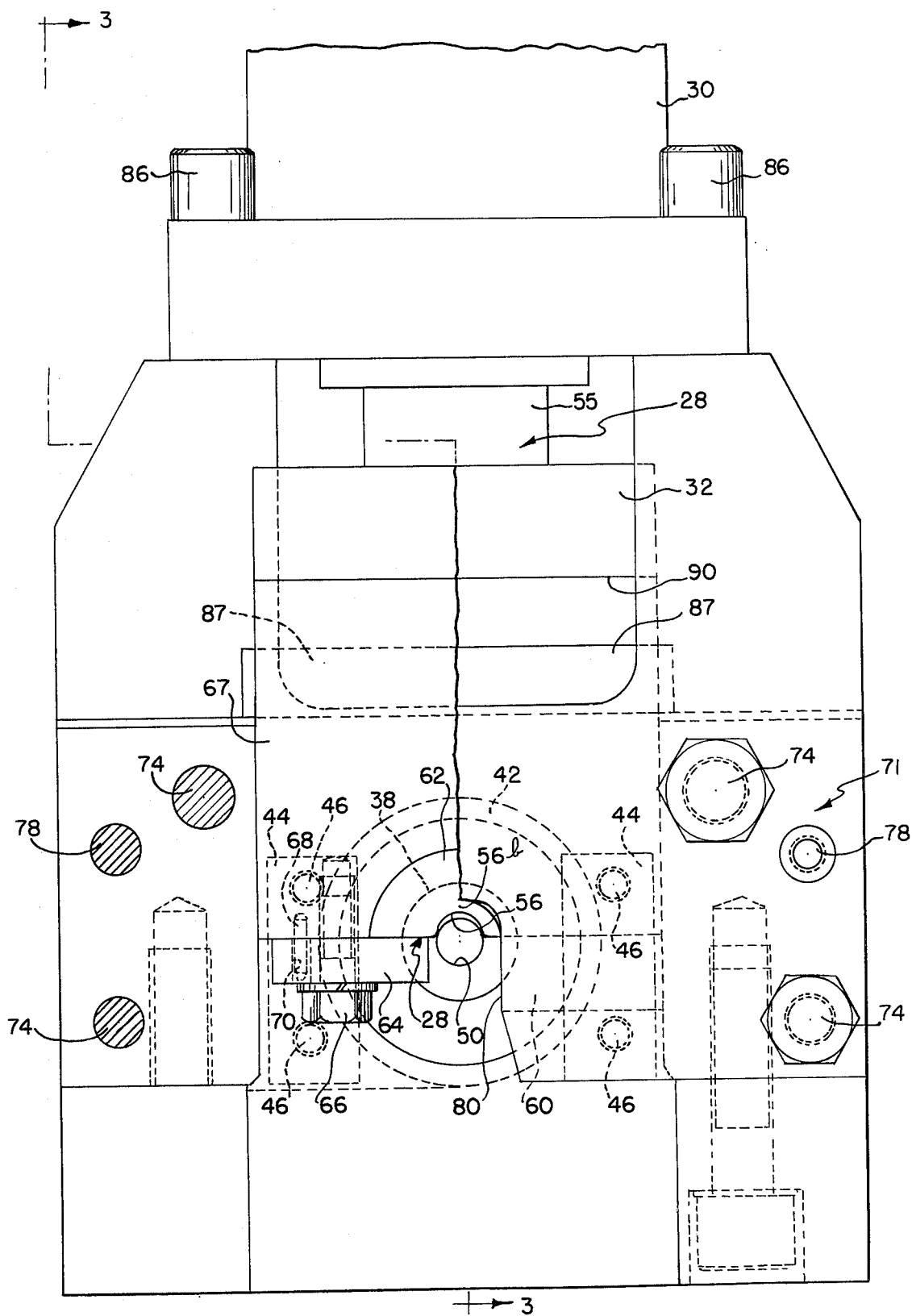
FIG. 4 is a partially broken view of the shearing mechanism of FIG. 3 taken generally along the plane of line 4—4 of FIG. 3, looking in the direction of the arrows.

The aforementioned cutter blade 32 may be attached as by means of threaded connection 54 to the extensible ram rod 55 of power cylinder 30, and includes a passageway 56 therethrough which in the embodiment illustrated is of generally semi-circular configuration in transverse section (FIG. 4). Passageway 56 comprises a generally linear longitudinally extending zone 56a and a longitudinal zone 56b which diverges from zone 56a (FIG. 3). Passageway 56 is preferably just slightly larger than the diameter of the workpiece bar or rod W to be sheared, and with such arrangement the shearing force is effectively concentrated at 56a immediately adjacent the zone 50 of holding die 38. The cutter blade 32 of the shearing means is guided in the pathway 34 in the shearing mechanism between the rear face of die 38 and a wear plate 60, and against which the vertically reciprocal shearing blade moves.

Shearing surface 56 may be formed in removable shearing portion 62, with removable portion 62 being held in position by means of retainer lugs 64, attached as by means of threaded fasteners 66 to the body 67 (FIG. 4) of the shearing blade 32. Locating dowel pins 68 may be provided on the body portion 67, adapted to be received in respective opening 70 in the associated retainer lug 64, for positioning the latter and preventing rotation of the associated lug 64.

Backing up and supporting wear plate 60 there is provided cover plate 71 which may be held to the body block 72 (FIG. 3) by means of threaded fasteners or bolts 74, detachably received in threaded openings 76 in the body block 72. Also locating dowel pins 78 (FIG. 4) may be provided on the cover plate adapted to be received in complementary openings in the body block 72 for properly locating the cover plate and associated wear plate 60 with respect to the body block 72 and to align the passageway 80 in the cover plate 71 and passageway 82 in the associated wear plate, with the axis of passageway 40 in the compression applying holding die 38.

The aforementioned ram 30 may be detachably secured to the body block 72 as by means of threaded fasteners 86. It will be seen that during reciprocal movement of the shearing blade 32, that it is guided in path 34 by the compression applying die 38 and the wear plate 60. Stop blocks 87 detachably secured as by means of threaded fasteners 88, may be provided for positively limiting the stroke of power ram 30. Blocks 87 are adapted for engagement with the shoulder surfaces 90 on the cutter blade head. Changing the size of the blocks 87 would of course change the stroke of the power ram for accommodating different workpiece sizes.

During the application of the workpiece to die 38, the workpiece is compressively loaded as it passes through the passageway 40 whereupon it exits out the rear of die 38 at zone 50 thereon. Upon actuation of the reciprocal blade 32, the latter moves downwardly, and shears off the protruding end of the workpiece W. The force of the cutter blade, due to the longitudinally extending linear portion 56a and the associated divergent portion 56b, is applied efffectively adjacent the compressive load being applied to the workpiece by the holding die; such compressive load, as aforementioned, being at least equal to the force necessary to cause plastic flow of the workpiece material (i.e. the yield strength in compression of the material).

During the shearing operation, the clamping unit 18 is actuated to steady the workpiece, after which deactuation thereof occurs. It will be seen that the workpiece can be sheared at any desired location lengthwise thereof, since the protruding end of the workpiece can extend through the passageways 56, 80 and 82 of respectively the cutter blade, wear plate 60 and cover plate 71, whatever extent desired. The end portion P (FIG. 1) sheared from the workpiece can drop down into chute 90 for transference to a collecting receptacle or the like, and the cylinder 16 is actuated to withdraw the workpiece from the die 38.

From the foregoing description and accompanying drawings it will be seen that the invention provides a novel apparatus for shearing a workpiece, such as an extruded bar without cracking or deformation thereof. The apparatus provides for application of a generally radial compressive force at least equal to the compressive force necessary to cause plastic flow in the material of the bar, and then applying a shearing force to the bar generally adjacent the compressive load on the bar. The invention also provides a novel shearing mechanism which includes a shearing portion comprising a generally linear section and a divergent section for accomplishing concentration of the shearing force to the bar workpiece generally adjacent the compression zone thereon.

The terms and expressions which have been used have been used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. An apparatus for shearing a workpiece such as a metal bar and the like comprising, means for applying to the bar to be sheared a generally radial substantially circumferentially applied compressive load of an extent at least equal to the force necessary to cause plastic flow of the bar material, means downstream from and adjacent the first mentioned means for shearing off the metal bar generally immediately adjacent the compressive load applying means and operative along a plane substantially perpendicular to the lengthwise axis of the bar, said shearing means comprising a reciprocal blade having a passageway therethrough, said passageway defining the shearing surface of said blade and comprising a generally linear section disposed adjacent said first mentioned means and a section diverging rearwardly from said linear section whereby the application of shearing force to the bar will be concentrated adjacent the compressive load applying means of said apparatus, and wherein the bar to be sheared is generally circular in cross section, said compressive load applying means comprising, a holding die, means for retaining the holding die in fixed position, said holding die including a generally inwardly tapered lengthwise passageway therethrough adapted for receiving the metal bar and cause application of the compressive load to the bar, the rearward end portion of said passageway through said holding die comprising a generally linearly extending section so that the circumferential compressive load applied by the holding die to the bar as it is forced through said die will be applied by said die passageway section for a predetermined extent lengthwise of the bar, a fluid powered reciprocal ram secured to said blade for actuating the latter, retainer means coacting with said blade for retaining the blade in its reciprocal path of movement, said blade passageway in end elevation being of generally semicircular shape configuration, and being of a diameter slightly larger than the diameter of said linear section of said passageway in said die, said retainer means including a wear means adapted for engagement with the rearward side of said blade for guiding the reciprocal movement thereof, said retainer means having a passageway therethrough generally in line with the first mentioned passageways and through which can extend the bar to be sheared for providing for shearing off the end of the bar at any selected point lengthwise thereof.

2. An apparatus for shearing a workpiece, such as a metal bar and the like comprising, means for applying to the bar to be sheared a generally radial substantially circumferentially applied compressive load of an extent at least equal to the force necessary to cause plastic flow of the bar material, and means downstream from and adjacent the first mentioned means for shearing off the metal bar generally immediately adjacent the compressive load applying means and operative along a plane substantially perpendicular to the lengthwise axis of the bar and wherein said shearing means comprises a shearing portion secured in a reciprocal support blade, said compressive load applying means comprising a holding die including a generally inwardly tapered lengthwise passageway therethrough adapted for receiving the metal bar and cause application of the compressive load to the bar, said shearing portion having a passageway therethrough defining the shearing surface thereof, said shearing passageway in end elevation being of generally semicircular shape and including a generally linear section disposed adjacent said compressive load applying means and a section diverging rearwardly from said linear section whereby the application of shearing force to the bar will be concentrated adjacent said compressive load applying means of said apparatus, said shearing passageway being of a diameter slightly larger than the diameter of said passageway through said holding die, and means removably securing said shearing portion to said support blade, said securing means comprising spaced lugs disposed on opposite sides of said shearing passageway, and threaded fastener means attaching said lugs in removable abutting condition to said support blade, said fastener means being spaced from said shearing portion with said lugs projecting laterally inwardly into abutting retaining condition to said shearing portion but out of interferring relation to said shearing passageway.

3. An apparatus in accordance with claim 2 including retainer means retaining said shearing means in its reciprocal path of movement, and wherein said retainer means includes a wear plate for engagement with said shearing means for guiding the reciprocal movement thereof, and means on said support blade coacting in locating relation with means on said lugs, for positioning the latter and aiding in preventing movement of said lugs.

4. An apparatus for shearing a workpiece such as a metal bar and the like comprising, means for applying to the bar to be sheared a generally radial substantially circumferentially applied compressive load of an extent at least equal to the force necessary to cause plastic flow of the bar material, and means downstream from and adjacent the first mentioned means for shearing off the metal bar generally immediately adjacent the compressive load applying means and operative along a plane substantially perpendicular to the lengthwise axis of the bar, said shearing means comprising a reciprocal blade having a passageway therethrough, said passageway defining the shearing surface of said blade and comprising a generally linear section disposed adjacent said first mentioned means and a section diverging rearwardly from said linear section, whereby the application of shearing force to the bar will be concentrated adjacent the compressive load applying means of said apparatus, and including retainer means adapted for retaining the shearing blade in its reciprocal path of movement, said compressive load applying means comprising a holding die including a generally inwardly tapered lengthwise passageway therethrough adapted for receiving the metal bar and cause application of the compressive load to the bar, said retainer means including a wear plate engageable with said shearing blade for guiding the reciprocal movement thereof, said retainer means including said wear plate having a passageway therethrough through which can extend the bar to be sheared, and providing for a selective length of piece sheared from the end of the bar, and means on said retainer means for generally aligning the passageway through said retainer means and wear plate with said passageway in said holding die.

* * * * *